US012767440B2

(12) United States Patent
Fagerland

(10) Patent No.: US 12,767,440 B2
(45) Date of Patent: Oct. 20, 2026

(54) ASSEMBLY, A STORAGE MODULE AND AN AUTOMATED STORAGE AND RETRIEVAL SYSTEM

(71) Applicant: Autostore Technology AS, Nedre Vats (NO)

(72) Inventor: Ingvar Fagerland, Kolnes (NO)

(73) Assignee: AutoStore Technology AS, Nedre Vats (NO)

( * ) Notice: Subject to any disclaimer, the term of this patent is extended or adjusted under 35 U.S.C. 154(b) by 311 days.

(21) Appl. No.: 18/702,206

(22) PCT Filed: Oct. 12, 2022

(86) PCT No.: PCT/EP2022/078368

§ 371 (c)(1),
(2) Date: Apr. 17, 2024

(87) PCT Pub. No.: WO2023/066750

PCT Pub. Date: Apr. 27, 2023

(65) Prior Publication Data

US 2024/0409313 A1 Dec. 12, 2024

(30) Foreign Application Priority Data

Oct. 19, 2021 (NO) .................................... 20211253

(51) Int. Cl.
*B65G 1/04* (2006.01)
*B65G 1/06* (2006.01)
(Continued)

(52) U.S. Cl.
CPC ............. *B65G 1/0464* (2013.01); *B65G 1/04* (2013.01); *B65G 1/0478* (2013.01); *B65G 1/06* (2013.01);
(Continued)

(58) Field of Classification Search
CPC ...... B65G 1/0464; B65G 1/04; B65G 1/0478; B65G 1/06; B65G 2203/0233;
(Continued)

(56) References Cited

U.S. PATENT DOCUMENTS

| | | | | |
|---|---|---|---|---|
| 5,074,496 A | 12/1991 | Rezag et al. | | |
| 8,342,400 B1 * | 1/2013 | Reese | G16H 20/13 | 340/568.1 |

(Continued)

FOREIGN PATENT DOCUMENTS

| | | |
|---|---|---|
| CA | 3100103 A1 | 12/2019 |
| CN | 206537811 U | 10/2017 |

(Continued)

OTHER PUBLICATIONS

International Search Report issued in PCT/EP2022/078368 on Feb. 10, 2023 (3 pages).

(Continued)

*Primary Examiner* — Thomas Randazzo
(74) *Attorney, Agent, or Firm* — Baker Botts L.L.P.

(57) ABSTRACT

An assembly includes a goods holder having a front side and a storage cell for storing the goods holder. At least a section of the front side is movable so as to allow access into the interior of the goods holder. The storage cell is provided with a locking mechanism configured to engage with the movable section of the front side of the stored goods holder so as to secure the movable section. The assembly is configured such that the goods holder stored in the storage cell is accessible from above by a remotely operated vehicle operating on a rail system.

15 Claims, 8 Drawing Sheets

(51) Int. Cl.

| | |
|---|---|
| ***E05B 47/00*** | (2006.01) |
| ***E05B 65/52*** | (2006.01) |
| ***G06Q 10/08*** | (2024.01) |
| ***G06Q 10/087*** | (2023.01) |

(52) U.S. Cl.
CPC ...... *E05B 47/0001* (2013.01); *E05B 65/5215* (2013.01); *G06Q 10/08* (2013.01); *G06Q 10/087* (2013.01); *B65G 2203/0233* (2013.01); *E05B 2047/0068* (2013.01)

(58) Field of Classification Search
CPC ............. E05B 47/0001; E05B 65/5215; E05B 2047/0068; G06Q 10/08; G06Q 10/087
See application file for complete search history.

(56) References Cited

U.S. PATENT DOCUMENTS

| | | | | |
|---|---|---|---|---|
| 2013/0261792 | A1 | 10/2013 | Gupta et al. | |
| 2018/0274259 | A1 | 9/2018 | Shinnaka et al. | |
| 2019/0062050 | A1* | 2/2019 | Benedict | B65G 1/0464 |
| 2021/0283017 | A1 | 9/2021 | Foubet et al. | |
| 2022/0194705 | A1* | 6/2022 | Hatteland | B65G 1/0485 |
| 2023/0211953 | A1* | 7/2023 | Mæhle | B65G 1/0464 700/218 |
| 2023/0257195 | A1* | 8/2023 | Lindbo | B65G 1/02 104/279 |
| 2023/0271778 | A1* | 8/2023 | Lindbo | B25J 9/0093 700/218 |

FOREIGN PATENT DOCUMENTS

| | | | | |
|---|---|---|---|---|
| CN | 211506650 U | | 9/2020 | |
| CN | 111747001 A | | 10/2020 | |
| NO | 317366 B1 | | 10/2004 | |
| TW | 201802009 A | | 1/2018 | |
| WO | 2014/075937 A1 | | 5/2014 | |
| WO | 2014/090684 A1 | | 6/2014 | |
| WO | 2015/193278 A1 | | 12/2015 | |
| WO | 2017211596 A1 | | 12/2017 | |
| WO | 2018/146304 A1 | | 8/2018 | |
| WO | 2019/206487 A1 | | 10/2019 | |
| WO | WO-2020094604 A1 | * | 5/2020 | G07F 5/26 |
| WO | 2020/0228375 A1 | | 11/2020 | |
| WO | WO-2021191335 A1 | * | 9/2021 | G07F 9/10 |

OTHER PUBLICATIONS

Written Opinion of the International Searching Authority issued in PCT/EP2022/078368 on Feb. 10, 2023 (7 pages).
Written Opinion of the International Preliminary Examining Authority issued in PCT/EP2022/078368 on May 2, 2022 (6 pages).
International Preliminary Report on Patentability issued in PCT/EP2022/078368 on Dec. 11, 2023 (6 pages).
Office Action issued in Norwegian Patent Application No. 20211253, mailed on May 9, 2022 (5 pages).
Norwegian Search Report issued in NO 20211253 mailed on May 9, 2022 (2 pages).
Zhu, Simin, Office action in Chinese patent application 202280084060.9, mailed Jul. 1, 2026, 10 pages, The State Intellectual Property Office of the People's Republic of China, Beijing, People's Republic of China.

* cited by examiner

ASSEMBLY, A STORAGE MODULE AND AN AUTOMATED STORAGE AND RETRIEVAL SYSTEM

The present invention primarily relates to an assembly comprising a goods holder and a storage cell for storing the goods holder.

BACKGROUND AND PRIOR ART

FIG. 1 discloses a prior art automated storage and retrieval system 1 with a framework structure 100 and FIGS. 2, 3*a*-3*b* disclose three different prior art container handling vehicles 201, 301, 401 suitable for operating on such a system 1.

The framework structure 100 comprises upright members 102 and a storage volume comprising storage columns 105 arranged in rows between the upright members 102. In these storage columns 105 storage containers 106, also known as bins, are stacked one on top of one another to form container stacks 107. The members 102 may typically be made of metal, e.g. extruded aluminum profiles.

The framework structure 100 of the automated storage and retrieval system 1 comprises a rail system 108 arranged across the top of framework structure 100, on which rail system 108 a plurality of container handling vehicles 301, 401 may be operated to raise storage containers 106 from, and lower storage containers 106 into, the storage columns 105, and also to transport the storage containers 106 above the storage columns 105. The rail system 108 comprises a first set of parallel rails 110 arranged to guide movement of the container handling vehicles 301, 401 in a first direction X across the top of the frame structure 100, and a second set of parallel rails 111 arranged perpendicular to the first set of rails 110 to guide movement of the container handling vehicles 301, 401 in a second direction Y which is perpendicular to the first direction X. Containers 106 stored in the columns 105 are accessed by the container handling vehicles 301, 401 through access openings 112 in the rail system 108. The container handling vehicles 301, 401 can move laterally above the storage columns 105, i.e. in a plane which is parallel to the horizontal X-Y plane.

The upright members 102 of the framework structure 100 may be used to guide the storage containers during raising of the containers out from and lowering of the containers into the columns 105. The stacks 107 of containers 106 are typically self-supportive.

Each prior art container handling vehicle 201, 301, 401 comprises a vehicle body 201*a*, 301*a*, 401*a* and first and second sets of wheels 201*b*, 201*c*, 301*b*, 301*c*, 401*b*, 401*c* which enable lateral movement of the container handling vehicles 201, 301, 401 in the X direction and in the Y direction, respectively. In FIGS. 2-3*b*, two wheels in each set are fully visible. The first set of wheels 201*b*, 301*b*, 401*b* is arranged to engage with two adjacent rails of the first set 110 of rails, and the second set of wheels 201*c*, 301*c*, 401*c* is arranged to engage with two adjacent rails of the second set 111 of rails. At least one of the sets of wheels 201*b*, 201*c*, 301*b*, 301*c*, 401*b*, 401*c* can be lifted and lowered, so that the first set of wheels 201*b*, 301*b*, 401*b* and/or the second set of wheels 201*c*, 301*c*, 401*c* can be engaged with the respective set of rails 110, 111 at any one time.

Each prior art container handling vehicle 201, 301, 401 also comprises a lifting device 304, 404 (visible in FIGS. 3*a*-3*b*) having a lifting frame part 304*a*, 404*a* for vertical transportation of storage containers 106, e.g. raising a storage container 106 from, and lowering a storage container 106 into, a storage column 105. The lifting device 304, 404 comprises one or more gripping/engaging devices which are adapted to engage a storage container 106, and which gripping/engaging devices can be lowered from the vehicle 201, 301, 401 so that the position of the gripping/engaging devices with respect to the vehicle 201, 301, 401 can be adjusted in a third direction Z (visible for instance in FIG. 1) which is orthogonal the first direction X and the second direction Y. Parts of the gripping device of the container handling vehicles 301, 401 are shown in FIGS. 3*a* and 3*b* indicated with reference number. The gripping device of the container handling device 201 is located within the vehicle body 201*a* in FIG. 2.

Conventionally, and also for the purpose of this application, Z=1 identifies the uppermost layer available for storage containers below the rails 110, 111, i.e. the layer immediately below the rail system 108, Z=2 the second layer below the rail system 108, Z=3 the third layer etc. In the exemplary prior art disclosed in FIG. 1, Z=8 identifies the lowermost, bottom layer of storage containers. Similarly, X=1 . . . n and Y=1 . . . n identifies the position of each storage column 105 in the horizontal plane. Consequently, as an example, and using the Cartesian coordinate system X, Y, Z indicated in FIG. 1, the storage container identified as 106' in FIG. 1 can be said to occupy storage position X=18, Y=1, Z=6. The container handling vehicles 201, 301, 401 can be said to travel in layer Z=0, and each storage column 105 can be identified by its X and Y coordinates. Thus, the storage containers shown in FIG. 1 extending above the rail system 108 are also said to be arranged in layer Z=0.

The storage volume of the framework structure 100 has often been referred to as a grid 104, where the possible storage positions within this grid are referred to as storage cells. Each storage column may be identified by a position in an X- and Y-direction, while each storage cell may be identified by a container number in the X-, Y- and Z-direction.

Each prior art container handling vehicle 201, 301, 401 comprises a storage compartment or space for receiving and stowing a storage container 106 when transporting the storage container 106 across the rail system 108. The storage space may comprise a cavity arranged internally within the vehicle body 201*a* as shown in FIGS. 2 and 3*b* and as described in e.g. WO2015/193278A1 and WO2019/206487A1, the contents of which are incorporated herein by reference.

FIG. 3*a* shows an alternative configuration of a container handling vehicle 301 with a cantilever construction. Such a vehicle is described in detail in e.g. NO317366, the contents of which are also incorporated herein by reference.

The cavity container handling vehicles 201 shown in FIG. 2 may have a footprint that covers an area with dimensions in the X and Y directions which is generally equal to the lateral extent of a storage column 105, e.g. as is described in WO2015/193278A1, the contents of which are incorporated herein by reference. The term 'lateral' used herein may mean 'horizontal'.

Alternatively, the cavity container handling vehicles 401 may have a footprint which is larger than the lateral area defined by a storage column 105 as shown in FIG. 3*b* and as disclosed in WO2014/090684A1 or WO2019/206487A1.

The rail system 108 typically comprises rails with grooves in which the wheels of the vehicles run. Alternatively, the rails may comprise upwardly protruding elements, where the wheels of the vehicles comprise flanges to prevent derailing. These grooves and upwardly protruding elements are collectively known as tracks. Each rail may comprise one track, or each rail may comprise two parallel tracks; in other rail systems 108, each rail in one direction may comprise one track and each rail in the other perpendicular direction may comprise two tracks. The rail system may also comprise a double track rail in one of the X or Y direction and a single track rail in the other of the X or Y direction. A double track rail may comprise two rail members, each with a track, which are fastened together.

WO2018/146304A1, the contents of which are incorporated herein by reference, illustrates a typical configuration of rail system 108 comprising rails and parallel tracks in both X and Y directions.

In the framework structure 100, a majority of the columns 105 are storage columns 105, i.e. columns 105 where storage containers 106 are stored in stacks 107. However, some columns 105 may have other purposes. In FIG. 1, columns 119 and 120 are such special-purpose columns used by the container handling vehicles 201, 301, 401 to drop off and/or pick up storage containers 106 so that they can be transported to an access station (not shown) where the storage containers 106 can be accessed from outside of the framework structure 100 or transferred out of or into the framework structure 100. Within the art, such a location is normally referred to as a 'port' and the column in which the port is located may be referred to as a 'port column' 119,120. The transportation to the access station may be in any direction, that is horizontal, tilted and/or vertical. For example, the storage containers 106 may be placed in a random or a dedicated column 105 within the framework structure 100, then picked up by any container handling vehicle and transported to a port column 119, 120 for further transportation to an access station. The transportation from the port to the access station may require movement along various different directions, by means such as delivery vehicles, trolleys or other transportation lines. Note that the term 'tilted' means transportation of storage containers 106 having a general transportation orientation somewhere between horizontal and vertical.

In FIG. 1, the first port column 119 may for example be a dedicated drop-off port column where the container handling vehicles 201, 301 can drop off storage containers 106 to be transported to an access or a transfer station, and the second port column 120 may be a dedicated pick-up port column where the container handling vehicles 201, 301, 401 can pick up storage containers 106 that have been transported from an access or a transfer station.

The access station may typically be a picking or a stocking station where product items are removed from or positioned into the storage containers 106. In a picking or a stocking station, the storage containers 106 are normally not removed from the automated storage and retrieval system 1, but are, once accessed, returned into the framework structure 100. A port can also be used for transferring storage containers to another storage facility (e.g. to another framework structure or to another automated storage and retrieval system), to a transport vehicle (e.g. a train or a lorry), or to a production facility.

A conveyor system comprising conveyors is normally employed to transport the storage containers between the port columns 119, 120 and the access station.

If the port columns 119, 120 and the access station are located at different heights, the conveyor system may comprise a lift device with a vertical component for transporting the storage containers 106 vertically between the port column 119, 120 and the access station.

The conveyor system may be arranged to transfer storage containers 106 between different framework structures, e.g. as is described in WO2014/075937A1, the contents of which are incorporated herein by reference.

When a storage container 106 stored in one of the columns 105 disclosed in FIG. 1 is to be accessed, one of the container handling vehicles 201, 301, 401 is instructed to retrieve the target storage container 106 from its position and transport it to the drop-off port column 119. This operation involves moving the container handling vehicle 201, 301 to a location above the storage column 105 in which the target storage container 106 is positioned, retrieving the storage container 106 from the storage column 105 using the container handling vehicle's 201, 301, 401 lifting device (not shown), and transporting the storage container 106 to the drop-off port column 119. If the target storage container 106 is located deep within a stack 107, i.e. with one or a plurality of other storage containers 106 positioned above the target storage container 106, the operation also involves temporarily moving the above-positioned storage containers prior to lifting the target storage container 106 from the storage column 105. This step, which is sometimes referred to as "digging" within the art, may be performed with the same container handling vehicle that is subsequently used for transporting the target storage container to the drop-off port column 119, or with one or a plurality of other cooperating container handling vehicles. Alternatively, or in addition, the automated storage and retrieval system 1 may have container handling vehicles 201, 301, 401 specifically dedicated to the task of temporarily removing storage containers 106 from a storage column 105. Once the target storage container 106 has been removed from the storage column 105, the temporarily removed storage containers 106 can be repositioned into the original storage column 105. However, the removed storage containers 106 may alternatively be relocated to other storage columns 105.

When a storage container 106 is to be stored in one of the columns 105, one of the container handling vehicles 201, 301, 401 is instructed to pick up the storage container 106 from the pick-up port column 120 and transport it to a location above the storage column 105 where it is to be stored. After storage containers 106 positioned at or above the target position within the stack 107 have been removed, the container handling vehicle 201, 301, 401 positions the storage container 106 at the desired position. The removed storage containers 106 may then be lowered back into the storage column 105 or relocated to other storage columns 105.

For monitoring and controlling the automated storage and retrieval system 1, e.g. monitoring and controlling the location of respective storage containers 106 within the framework structure 100, the content of each storage container 106 and the movement of the container handling vehicles 201, 301, 401 so that a desired storage container 106 can be delivered to the desired location at the desired time without the container handling vehicles 201, 301, 401 colliding with each other, the automated storage and retrieval system 1 comprises a control system 500 (shown in FIG. 1) which typically is computerized and which typically comprises a database for keeping track of the storage containers 106.

Frequently, an automated storage and retrieval system of the kind described in conjunction with FIG. 1 is integrated with a retail establishment. More specifically, an automated storage and retrieval system of this kind typically comprises an area where products purchased by the customer are aggregated into standard storage containers of the system and staged, i.e. waiting for a customer delivery procedure to be initiated. One way to deliver these storage containers is to provide a dedicated delivery port close to the checkout counter of the retail establishment. At this delivery port, the storage containers originating from the staging area and containing purchased products are delivered to a waiting customer. As the number of such ports normally is limited in an automated storage and retrieval system, delivery delays frequently occur, especially in peak periods.

Another method to deliver purchased products, especially common in connection with online shopping, is to avoid storage containers altogether in the delivery phase and use conventional parcel lockers. These lockers are standalone kiosks comprising a plurality of locker compartments, typically provided close to customer's domicile, i.e. at a significant distance from the automated storage and retrieval system of the kind described in conjunction with FIG. 1. More specifically, purchased products are delivered by a courier transporting, e.g. by means of a lorry, a parcel containing purchased products to a parcel locker and manually inserting this parcel into a suitably sized locker compartment. Once he/she receives a notification that the parcel is delivered to the locker, the customer may collect the parcel. As easily inferred, this method is very labor-intensive. One system of this kind is disclosed in US2013/0261792A1.

In view of all of the above, it is desirable to provide a solution that solves or at least mitigates one or more of the aforementioned problems belonging to the prior art.

SUMMARY OF THE INVENTION

The present invention is set forth and characterized in the independent claims, while the dependent claims describe other characteristics of the invention. First aspect of the invention relates to an assembly comprising:

- a goods holder comprising a front side, wherein at least a section of the front side is movable so as to allow access into the interior of the goods holder,
- a storage cell for storing the goods holder, and
- said storage cell being provided with a locking mechanism configured to engage with the movable section of the front side of the stored goods holder so as to secure said movable section.

By providing an assembly in accordance with the first aspect of the invention, a fully automated solution, i.e. a solution that doesn't require attendance by an operator for product delivery, is obtained. More specifically, container handling vehicles stack goods holders filled with purchased products into storage cells in a usual manner whereby locking mechanism associated with the storage cell is activated. The storage cells containing goods holders are located in an area accessible by customers-a so-called pick-up area. Thus, a customer desiring to collect purchased products only needs to access the pick-up area and deactivate the locking mechanism in order to gain access to the interior of the goods holder and complete the pick-up. The deactivation is normally triggered by the customer using a suitable human-machine-interface in order to provide instructions to a control system associated with the locking mechanism associated with the storage cell.

Second aspect of the invention relates to a module comprising a plurality of assemblies of storage cells and therein stored goods holders.

Such a module obviates the need for a dedicated product-staging area—the purchased products are immediately stored in a module placed in an area that serves as a combined staging area and pick-up area. In a related context, customer waiting times are significantly reduced because once the goods holder is in the storage cell, it is immediately available for pickup.

Also, by virtue of the module in accordance with the second aspect of the invention, all goods holders are at all times accessible for customers such that high pick-up throughput may be achieved.

Typically, the module is detachable and suitable for coupling, e.g. slotting, to a framework structure of an automated storage and retrieval system shown in FIG. 1. By way of example, coupling of the module to the automated storage and retrieval system may be effectuated by means of a forklift. As an alternative, the module may be provided with wheels so as to enable manual handling. Regardless of the method used, it is necessary to properly align the module with the system. This may be achieved in various ways well known to the person skilled in the art.

Third aspect of the invention relates to an automated storage and retrieval system comprising the above-discussed module, said system further comprising a storage grid and a rail system arranged across the top of the automated storage and retrieval system, wherein goods holders may be bidirectionally transferred between the storage grid and the storage cells of the module by means of remotely operated vehicle operating on the rail system.

Hereby, a simple solution for quickly replenishing the module is achieved. More specifically, the remotely operated vehicles operating on the rail system have access from above to the system as well as to the module. If a transfer of goods holder(s), either from the module to the rest of the system, or in the opposite direction, is required, the highly efficient, system-native remotely operated vehicles are employed.

Fourth aspect of the invention relates to a method of accessing the interior of a goods holder stored in a storage cell. For the sake of brevity, advantages discussed above in connection with the first to third aspects of the invention may even be attributed to the method and are not further discussed.

For the purposes of this application, the term "container handling vehicle" used in "Background and Prior Art"-section of the application and the term "remotely operated vehicle" used in "Summary of the Invention"—and Detailed Description of the Invention"—sections both define a robotic wheeled vehicle operating on a rail system arranged across the top of the framework structure being part of an automated storage and retrieval system.

Analogously, the term "storage container" used in "Background and Prior Art"-section of the application and the term "goods holder" used in "Detailed Description of the Invention"-section both define a receptacle for storing items. In this context, the goods holder can be a bin, a tote, a pallet, a tray or similar. Different types of goods holders may be used in the same automated storage and retrieval system.

The relative terms "upper", "lower", "below", "above", "higher" etc. shall be understood in their normal sense and as seen in a Cartesian coordinate system. When mentioned in relation to a rail system, "upper" or "above" shall be understood as a position closer to the surface rail system (relative to another component), contrary to the terms "lower" or "below" which shall be understood as a position further away from the rail system (relative another component).

BRIEF DESCRIPTION OF THE DRAWINGS

Following drawings are appended to facilitate the understanding of the invention. The drawings show embodiments of the invention, which will now be described by way of example only, where.

DETAILED DESCRIPTION OF THE INVENTION

Figure 1:
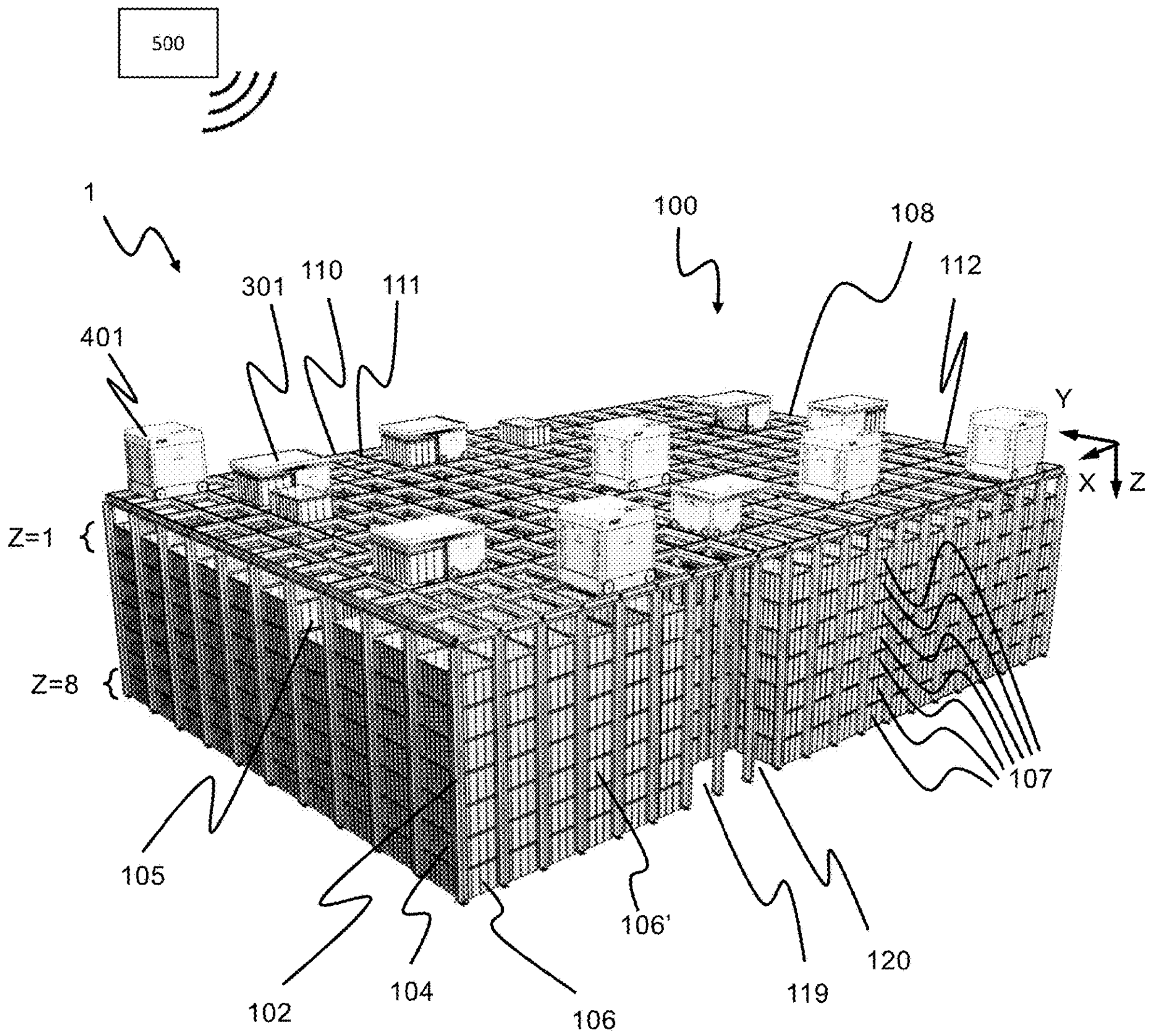
Fig. 1 (Prior Art)
FIG. 1 is a perspective view of a framework structure of an automated storage and retrieval system belonging to prior art.
Figure 2:
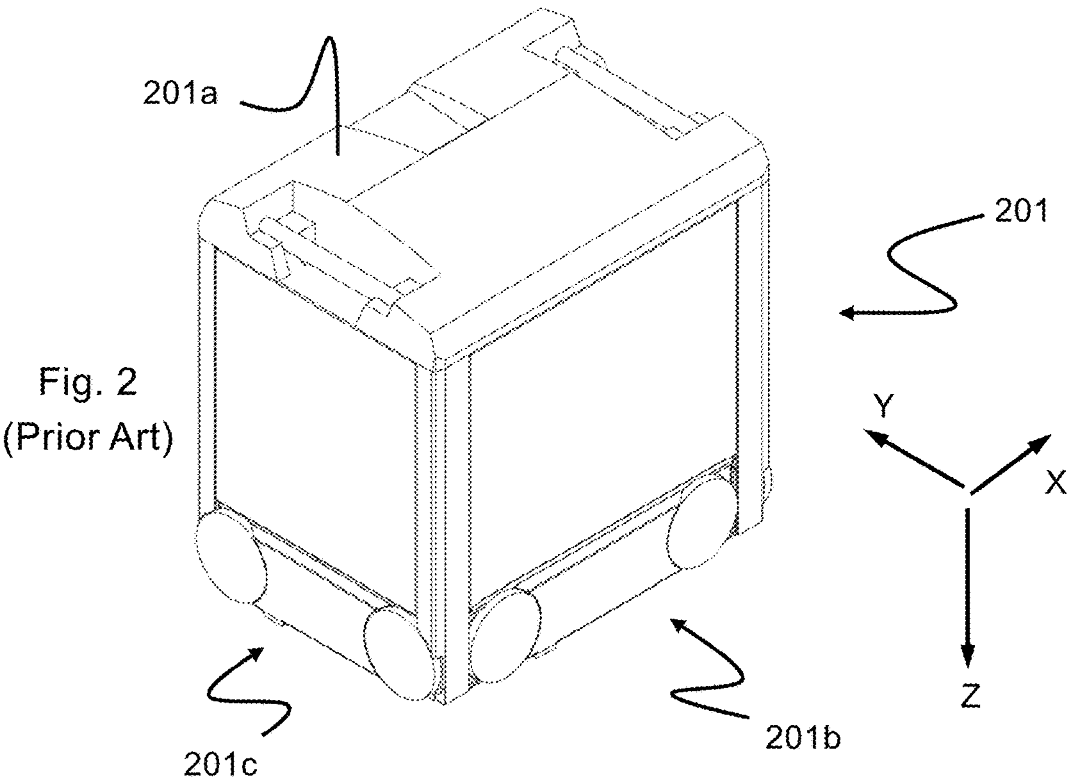
Fig. 2 (Prior Art)
FIG. 2 is a perspective view of a prior art container handling vehicle having a centrally arranged cavity for carrying storage containers therein.

In the following, embodiments of the invention will be discussed in more detail with reference to the appended drawings. It should be understood, however, that the drawings are not intended to limit the invention to the subject-matter depicted in the drawings.

The framework structure 100 of the automated storage and retrieval system 1 is constructed in accordance with the prior art framework structure 100 described above in connection with FIGS. 1-3*b*, i.e. a number of upright members 102, wherein the framework structure 100 also comprises a first, upper rail system 108 in the X direction and Y direction.

The framework structure 100 further comprises storage compartments in the form of storage columns 105 provided between the members 102 where storage containers 106 are stackable in stacks 107 within the storage columns 105.

The framework structure 100 can be of any size. In particular, it is understood that the framework structure can be considerably wider and/or longer and/or deeper than disclosed in FIG. 1. For example, the framework structure 100 may have a horizontal extent of more than 700×700 columns and a storage depth of more than twelve containers.

Figure 4A:
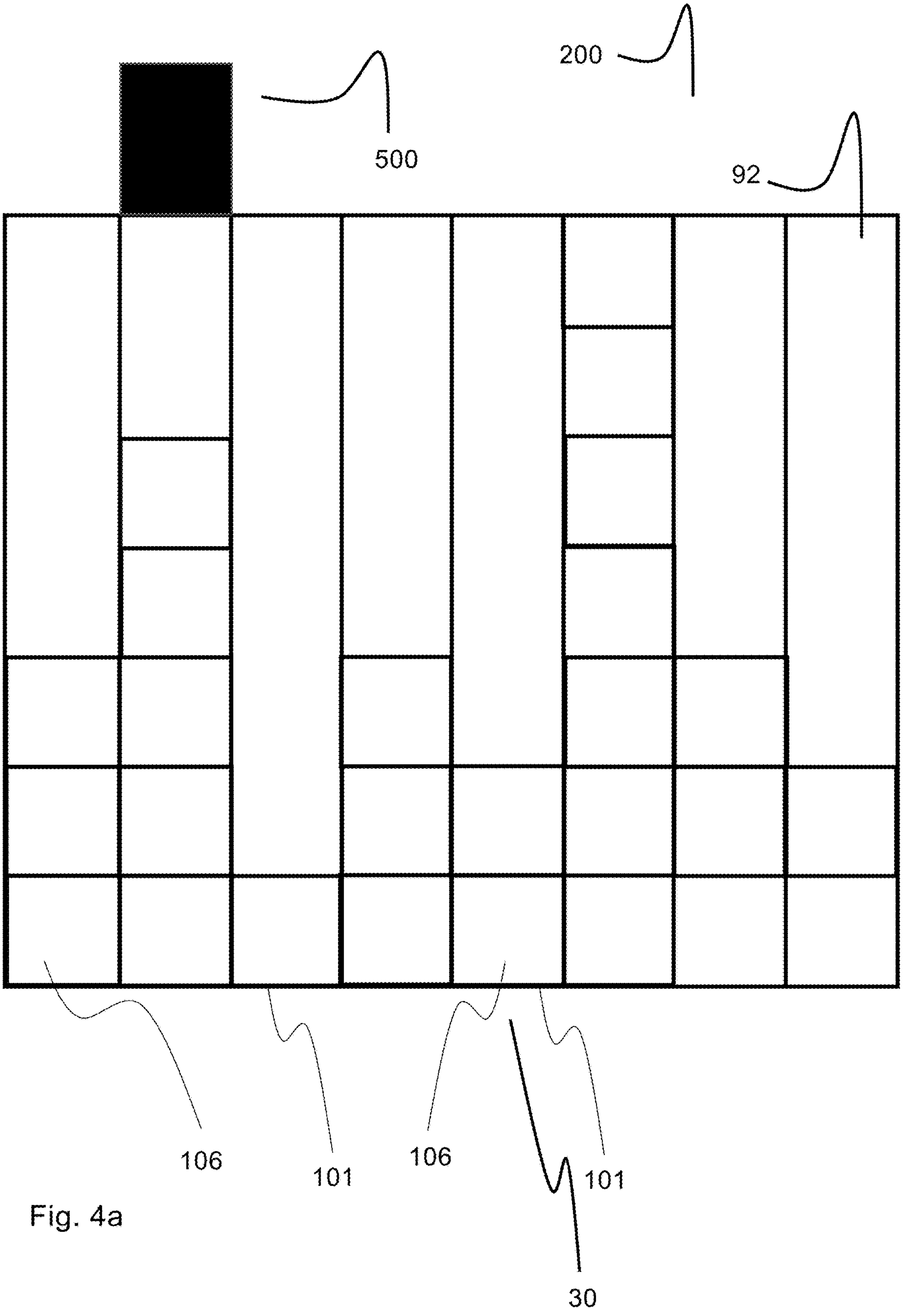
FIG. 4*a* is a perspective view of a storage and pick-up module in accordance with one embodiment of the present invention.

FIG. 4*a* is a perspective view of a storage and pick-up module 200. The module 200 comprises a plurality of assemblies 30. Each assembly 30 comprises a goods holder 106 stored in a storage cell 101. The goods holders 106 are arranged in stacks so that these stacks extend vertically along a storage column 92 of the module 200. A remotely operated vehicle 500 for handling goods holders 106 is also shown. The vehicle 500 moves along the rails having the same function as the rails discussed in connection with FIG. 1. Normally, the module 200 is coupled to a framework structure of an automated storage and retrieval system shown in FIG. 1. Still with reference to FIG. 1, such a system typically comprises a storage grid and a rail system arranged across the top of the automated storage and retrieval system. The goods holders 106 may be bidirectionally transferred between the storage grid and the storage cells 101 of the module 200. This transfer is carried out by the remotely operated vehicle 500.

Hereby, a simple solution for quickly replenishing the module 200 is achieved. More specifically, the remotely operated vehicles 500 operating on the rail system have access from above to the system as well as to the module 200. If a transfer of goods holder(s) 106, either from the module 200 to the rest of the system, or in the opposite direction, is required, the highly efficient, system-native remotely operated vehicles 500 are employed.

In the related context, the use of module 200 obviates the need for a dedicated product-staging area—the purchased products are immediately stored in a module 200 placed in an area that serves as a combined staging area and pick-up area. Hereby, customer waiting times are significantly reduced because once the goods holder is in the storage cell 101 of the module 200, it is immediately available for pickup. Also, by virtue of the module, all goods holders 106 are at all times accessible for customers such that high pick-up throughput may be achieved.

Typically, the module 200 is detachable and suitable for coupling, e.g. slotting, to a framework structure of an automated storage and retrieval system shown in FIG. 1. By way of example, coupling of the module 200 to the automated storage and retrieval system may be effectuated by means of a forklift (not shown). As an alternative, the module 200 may be provided with wheels (not shown) so as to enable manual handling. Regardless of the method used, it is necessary to properly align the module with the system. This may be achieved in various ways well known to the person skilled in the art. By way of example, a detached module may advantageously be positioned outside of the warehouse in order to provide 24/7 access.

Figure 4B:
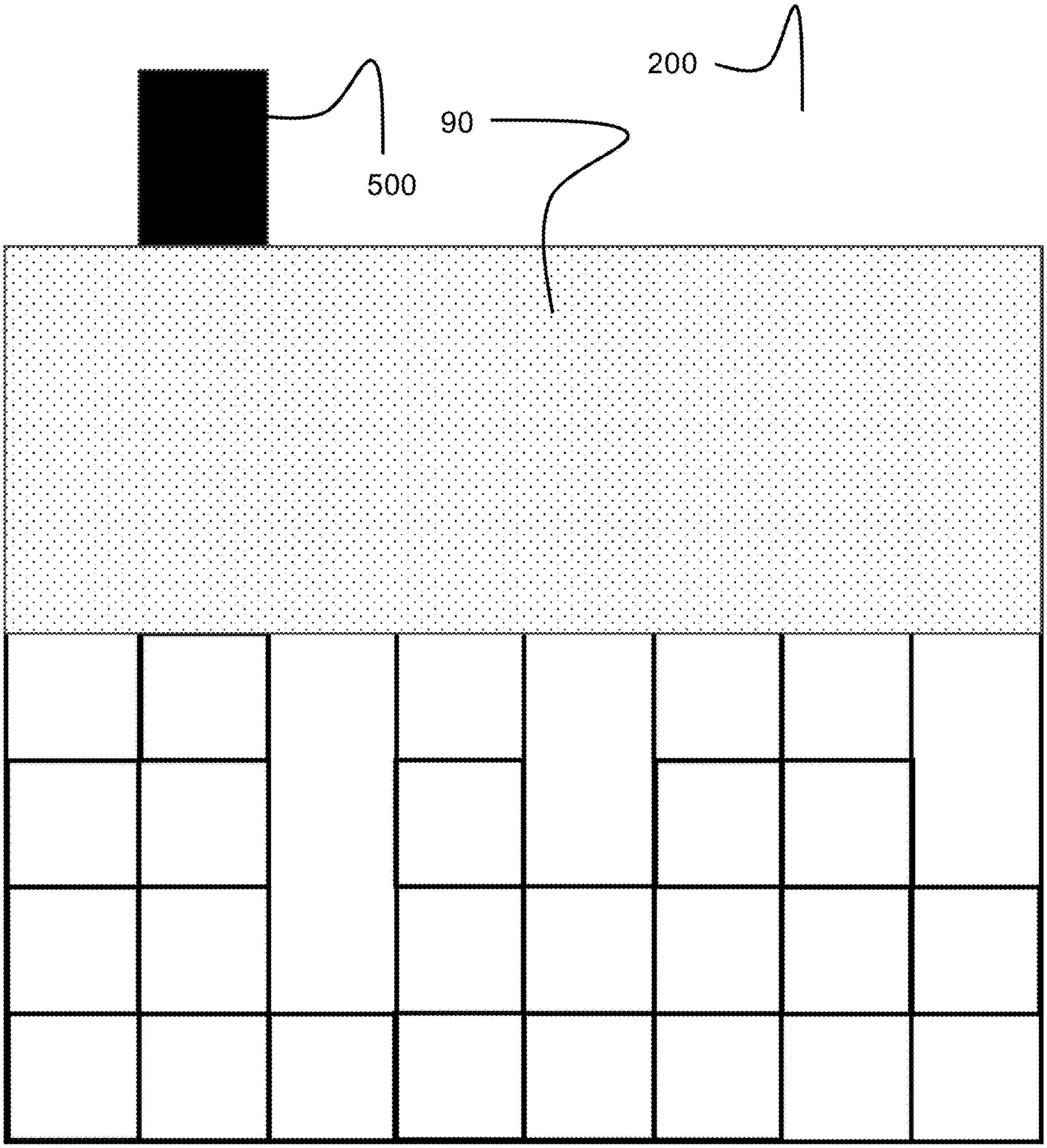
FIG. 4*b* is a perspective view of the module of FIG. 4*a* further showing a protective structure in accordance with one embodiment of the present invention.

FIG. 4*b* is a perspective view of the module 200 of FIG. 4*a* further showing a two-dimensional, vertically extending protective structure 90. The protective structure 90 covers front side of the goods holders stored in storage cells. The main purpose of the protective structure is to ensure customer safety in situations involving moving parts. More specifically, customers are prevented from inserting their hands into an empty storage cell while said cell is receiving the goods holder (introduced by the robot 500). The protective structure 90 may have different shapes and sizes. For the sake of brevity, the parts discussed above in connection with FIG. 4*a* are not further discussed in connection with FIG. 4*b*.

Figure 3A:
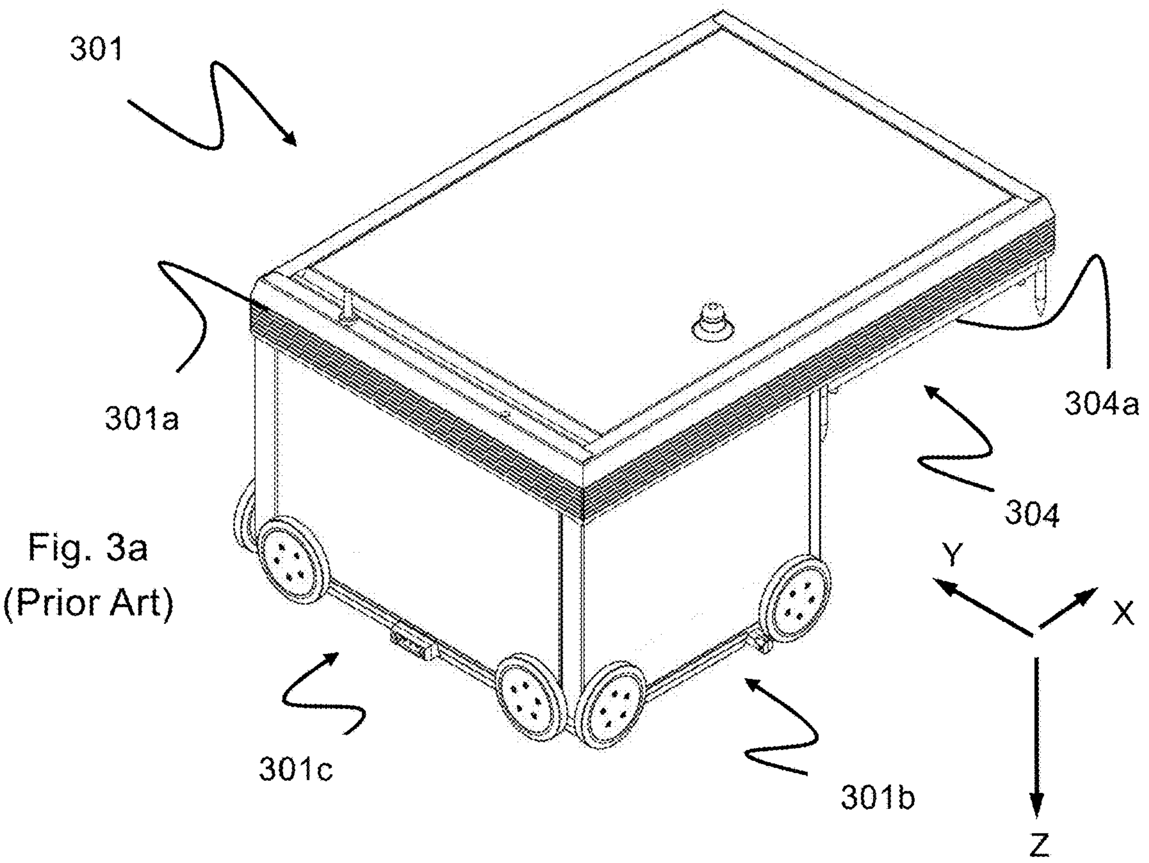
Fig. 3a (Prior Art)
FIG. 3*a* is a perspective view of a prior art container handling vehicle having a cantilever for carrying storage containers underneath.
Figure 3B:
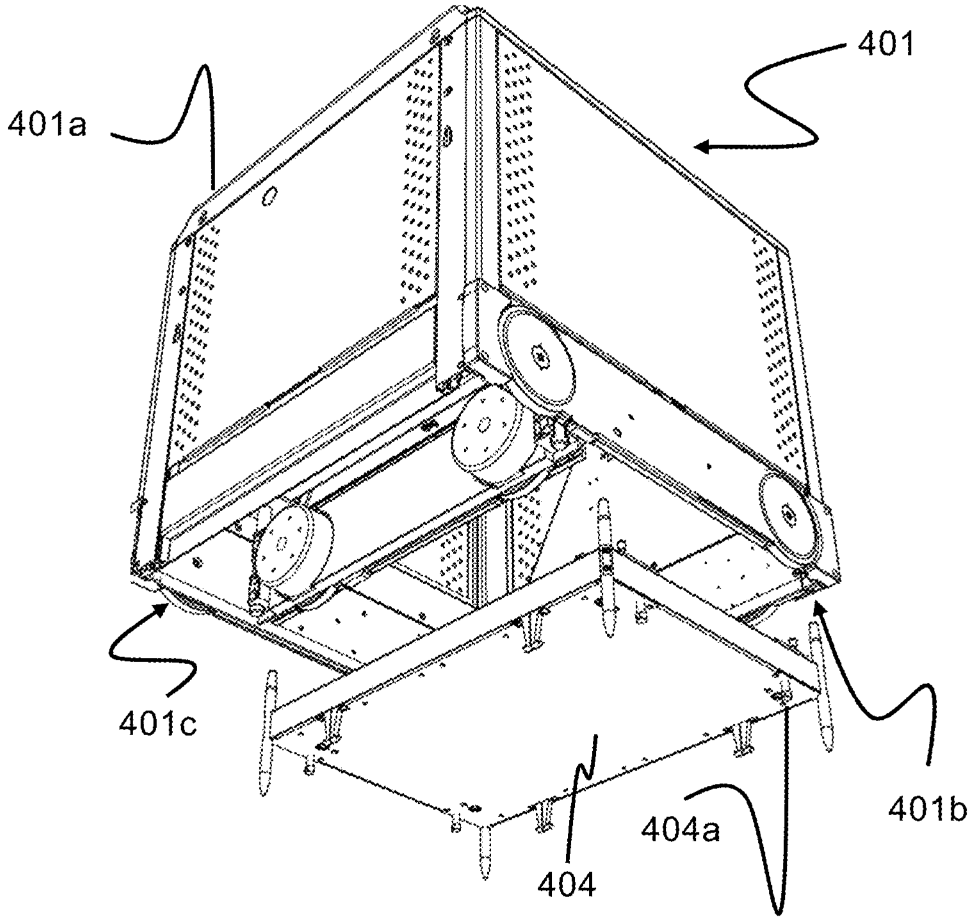
Fig. 3b (Prior Art)
FIG. 3*b* is a perspective view, seen from below, of a prior art container handling vehicle having an internally arranged cavity for carrying storage containers therein.
Figure 5A:
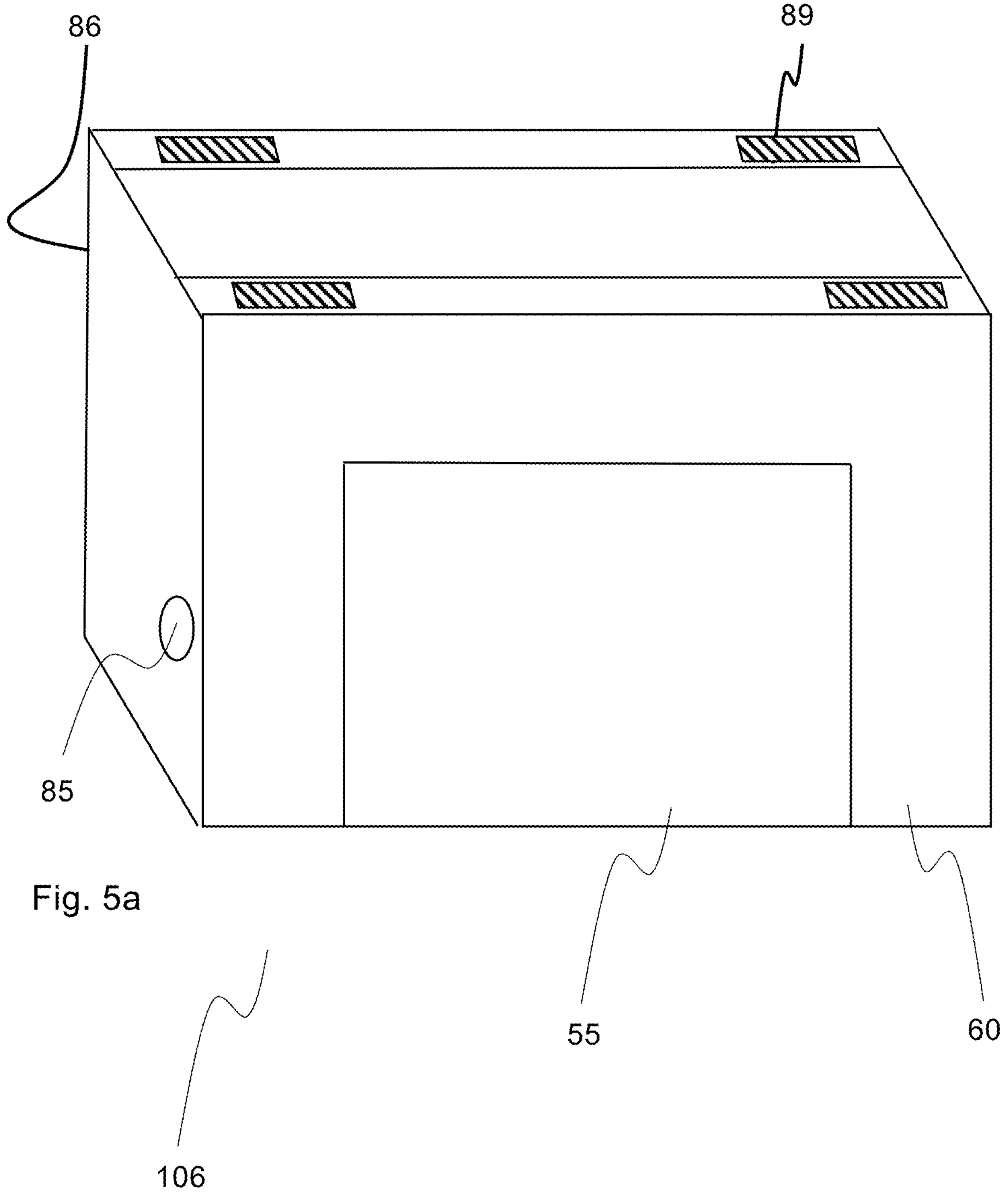
FIG. 5*a* shows a goods holder of the present invention in closed state.

FIG. 5*a* shows a goods holder 106 of the present invention in closed state. The goods holder 106 comprises a front side 60. A section 55 of the front side 60 is movable, preferably pivotable, so as to allow access into the interior of the goods holder 106. An inlet 85 of a through-hole arranged in a first lateral side 86 of the goods holder 106 may also be seen. Further, recesses 89, for receiving gripper elements shown in connection with FIG. 3*b*, are arranged in a body of the goods holder 106. With reference to FIG. 4*a*, it is necessary to ensure that the movable section 55 is closed, i.e. in the state shown in FIG. 5*a*, prior to the goods holder being transferred between the storage grid and the storage cells of the module.

In one embodiment, goods holders 106 are made in polymer material and share a lot of structural properties with the traditional goods holders for use in the system of FIG. 1. In the context, goods holders 106 have the same size as the traditional goods holders. In another embodiment, the polymer goods holders have thicker walls and/or are structurally reinforced, alternatively made in metal such as steel.

Figure 5B:
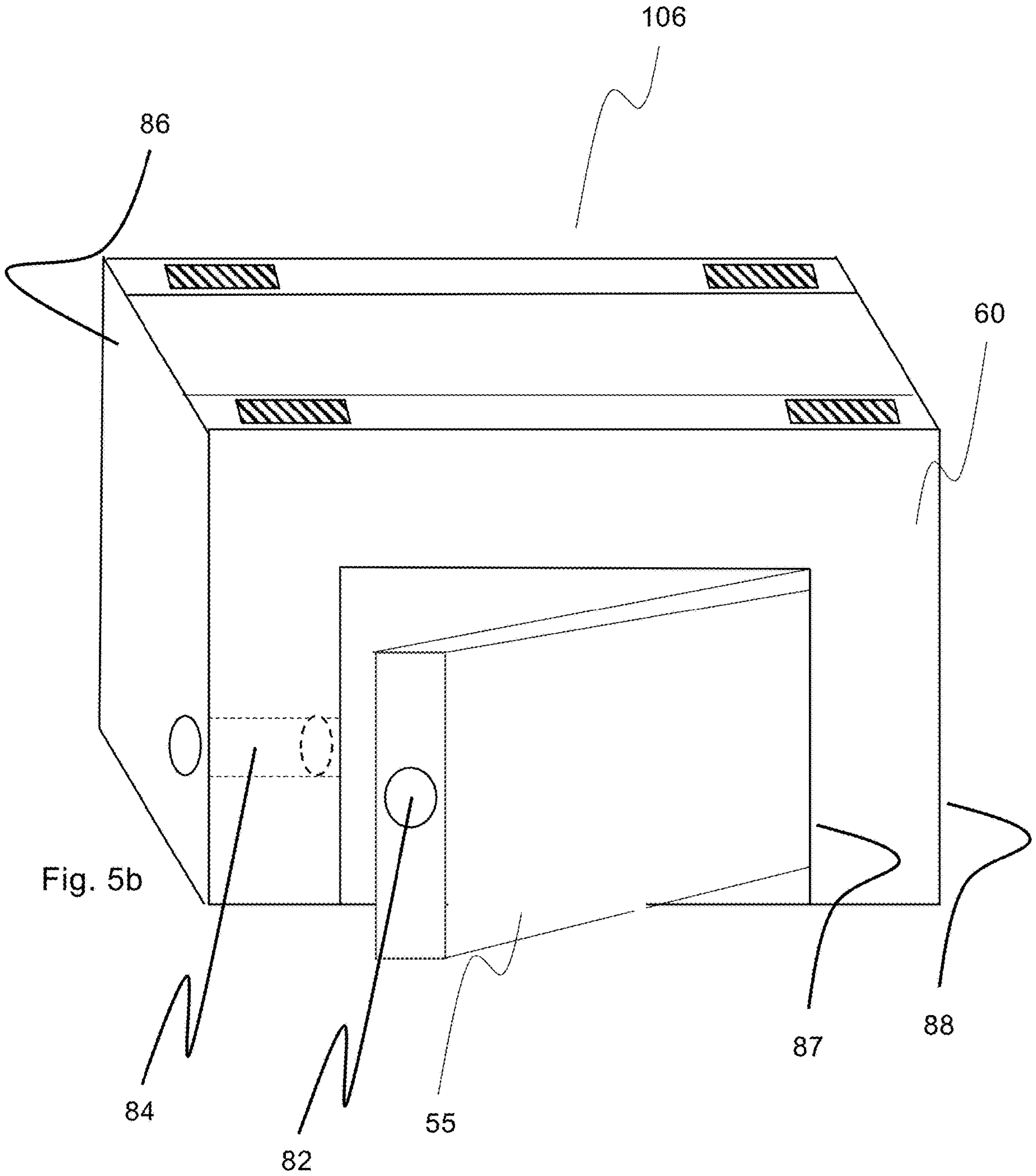
FIG. 5*b* shows a goods holder of the present invention in open state.

FIG. 5*b* shows a goods holder 106 of the present invention in open state. The movable section 55 comprises a horizontally extending blind hole 82 for receiving a bolt of a locking mechanism discussed in connection with FIG. 6. A horizontally extending through-hole 84 for receiving said bolt is arranged in a first lateral side 86 of the goods holder. The through-hole 84 becomes aligned with the blind hole 82 of the movable section 55 when the movable section 55 is secured. In the shown embodiment, the movable section 55 is a door hinged along an edge 87 of the goods holder 106, said edge 87 being associated with a second lateral side 88 of the goods holder. The second lateral side 88 is arranged opposite the first lateral side 86. For the sake of brevity, the parts discussed above in connection with FIG. 5*a* are not further discussed in connection with FIG. 5*b*.

Figure 6:
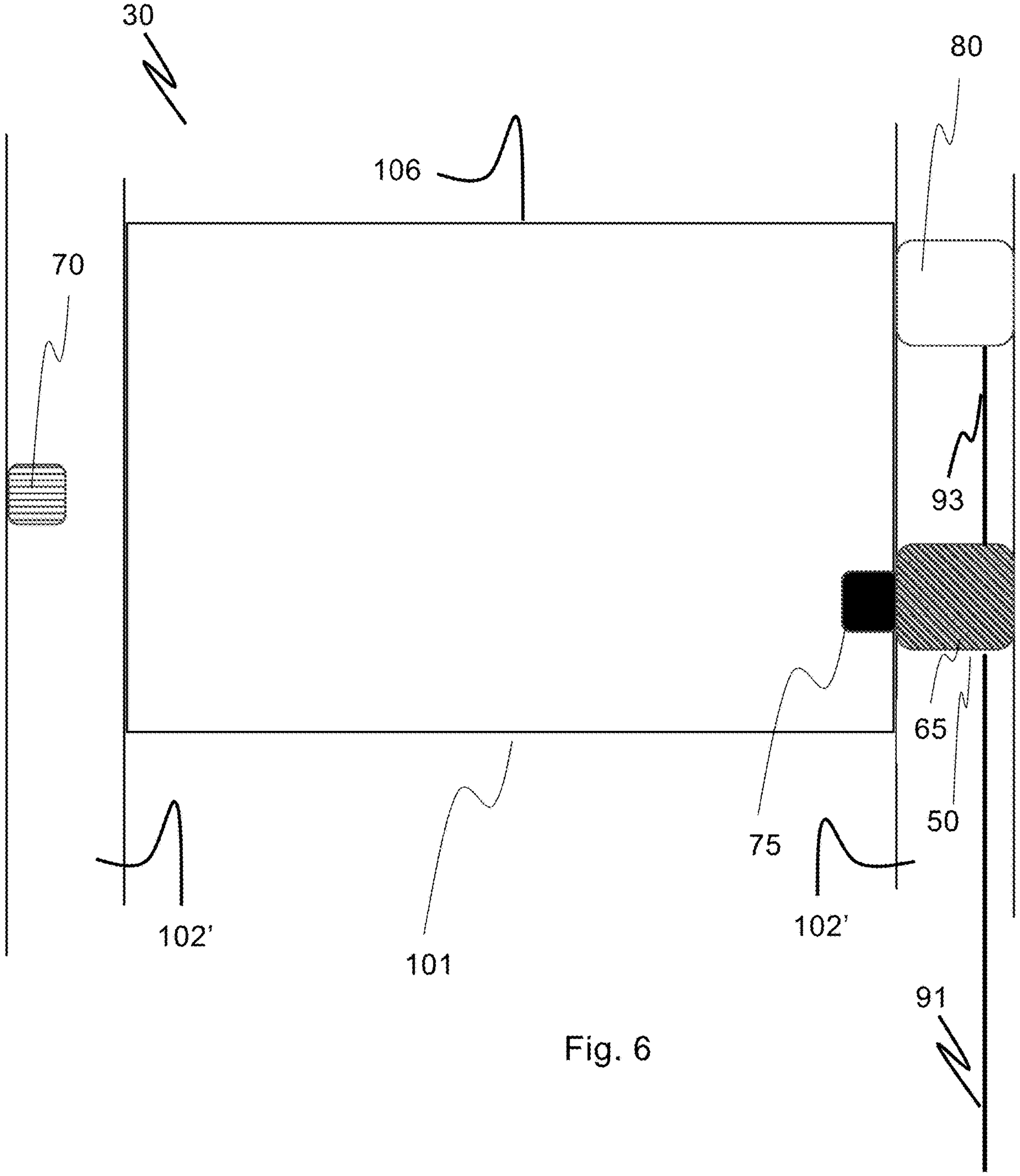
FIG. 6 shows details of a storage cell of the present invention.

FIG. 6 shows details of a storage cell 101 for storing the goods holder 106. The storage cell 101 and the goods holder 106, tightly fit into said cell, make up an assembly 30. The storage cell 101 is provided with a locking mechanism 50 configured to engage with the movable section of the front side (shown in FIG. 5*b*) of the stored goods holder 106 so as to secure said movable section. The storage cell 101 is laterally delimited by portions of vertically extending upright members 102' and the locking mechanism 50 is attached to the one, vertically extending upright member 102'.

The storage cell 101 is also provided with a sensor 70 for detecting position of the movable section of the front side. The locking mechanism 50 comprises a movable bolt 75 and an actuator 65 which activates the bolt 75 so that said bolt engages with the movable section of the front side provided that the sensor 70 determines that the section is in the correct position. For the sake of clarity, the movable bolt 75 is shown in activated state in FIG. 6. The storage cell 101 further comprises a control unit 80 for controlling operation of the actuator 65. A cable 93 carries control signals from the control unit 80 to the actuator 65 of the locking mechanism 50. Power required for movement of the bolt is supplied via power cable 91 (power source is not shown in FIG. 6).

Hereby, a fully automated solution, i.e. a solution that doesn't require attendance by an operator for product delivery, is obtained. More specifically and with reference to FIG. 4*a*, container handling vehicles stack goods holders filled with purchased products into storage cells of the module in a usual manner whereby locking mechanism associated with each storage cell is activated. The storage cells containing goods holders are located in an area accessible by customers-a so-called pick-up area. Thus, a customer desiring to collect purchased products only needs to access the pick-up area and deactivate the locking mechanism 50 in order to gain access to the interior of the goods holder and complete the pick-up. The deactivation is normally triggered by the customer using a suitable human-machine-interface in order to provide instructions to the control unit 80 controlling the locking mechanism 50 associated with the storage cell 101. Such an interface could be a terminal located on a front side of the module of FIG. 4*a*. As an alternative, the interaction between the customer and the control unit 80 is based on wireless communication and is initiated by the customer providing instructions via his/hers smart phone.

To ensure proper alignment of the bolt 75 and the through-hole of FIG. 5*b*, the storage cell 101 could comprise a detector (not shown) for determining position of the goods holder when stored in the storage cell.

In the preceding description, various aspects of the assembly comprising a goods holder and a storage cell for storing the goods holder according to the invention have been described with reference to the illustrative embodiments. For purposes of explanation, specific numbers, systems and configurations were set forth in order to provide a thorough understanding of the system and its workings. However, this description is not intended to be construed in a limiting sense. Various modifications and variations of the illustrative embodiment, as well as other embodiments of the system, which are apparent to persons skilled in the art to which the disclosed subject matter pertains, are deemed to lie within the scope of the present invention.

LIST OF REFERENCE NUMBERS

1 Storage and retrieval system
30 Assembly
50 Locking mechanism
55 Section of the front side
60 Front side
65 Actuator
70 Sensor
75 Bolt
80 Control unit
82 Blind hole
84 Through hole
85 Inlet
86 First lateral side
87 Edge
88 Second lateral side
89 Recess
90 Protective structure
91 Power cable
92 Storage column of the module
93 Cable
100 Framework structure
101 Storage cell
102 Upright members of framework structure
102' Upright members of the module
104 Storage grid
105 Storage column
106 Storage container/Goods holder
106' Particular position of storage container
107 Stack of storage containers
108 Rail system
110 Parallel rails in first direction (X)
111 Parallel rails in second direction (Y)
112 Access opening
119 First port column
200 Module
201 Container handling vehicle belonging to prior art
201*a* Vehicle body of the container handling vehicle 201
201*b* Drive means/wheel arrangement, first direction (X)
201*c* Drive means/wheel arrangement, second direction (Y)
301 Cantilever-based container handling vehicle belonging to prior art
301*a* Vehicle body of the container handling vehicle 301
301*b* Drive means in first direction (X)
301*c* Drive means in second direction (Y)
401 Container handling vehicle belonging to prior art
401*a* Vehicle body of the container handling vehicle 401
401*b* Drive means in first direction (X)
401*c* Drive means in second direction (Y)
500 Remotely operated vehicle
X First direction
Y Second direction
Z Third direction

The invention claimed is:

1. An assembly comprising:

a goods holder comprising a front side, wherein at least a section of the front side is movable so as to allow access into an interior of the goods holder, a storage cell for storing the goods holder, said storage cell being provided with a locking mechanism configured to engage with the movable section of the front side of the stored goods holder so as to secure said movable section, wherein said assembly is configured such that the goods holder stored in the storage cell is accessible from above by means of a remotely operated vehicle operating on a rail system.

2. An assembly of claim 1, wherein said storage cell is provided with a sensor for detecting position of the movable section of the front side.

3. An assembly of claim 1, wherein said storage cell further comprises a detector for determining position of the goods holder when stored in the storage cell.

4. An assembly of claim 1, wherein said storage cell is laterally delimited by portions of vertically extending upright members and said locking mechanism is attached to a vertically extending upright member.

5. An assembly of claim 1, wherein said movable section is pivotable.

6. An assembly of claim 1, wherein the goods holder is from a plurality of goods holders being stored in storage cells being arranged in at least one stack of a storage module.

7. An assembly of claim 6, wherein said storage module comprises a two-dimensional, vertically extending protective structure covering the front side of the plurality of goods holders stored in storage cells.

8. An assembly of claim 6, wherein said storage module is for coupling to a framework structure of an automated storage and retrieval system, said automated storage and retrieval system comprising a storage volume consisting of storage columns.

9. An assembly of claim 6, further comprising an automated storage and retrieval system comprising a storage grid and a rail system arranged across a top of the automated storage and retrieval system, wherein the plurality of goods holders are bidirectionally transferred between the storage grid and the storage cells of the storage module by a remotely operated vehicle operating on the rail system.

10. An assembly of claim 1, wherein the locking mechanism comprises a movable bolt and an actuator which activates the bolt so that said bolt engages with the movable section of the front side.

11. An assembly of claim 10, wherein said storage cell further comprises a control unit for controlling operation of the actuator.

12. An assembly of claim 10, wherein said movable section comprises at least one horizontally extending blind hole for receiving the bolt.

13. An assembly of claim 12, wherein at least one horizontally extending through-hole for receiving the bolt is arranged in a first lateral side of the goods holder, said through-hole being aligned with the blind hole of said movable section when the movable section is secured.

14. An assembly of claim 13, wherein said movable section is a door hinged along an edge of the goods holder, said edge being associated with a second lateral side of the goods holder, said second lateral side being arranged opposite said first lateral side.

15. A method of accessing an interior of a goods holder stored in a storage cell provided with a locking mechanism, the goods holder and the storage cell making up an assembly, said assembly being configured such that the goods holder stored in the storage cell is accessible from above by means of a remotely operated vehicle operating on a rail system, said method comprising:

in response to a signal, disengaging said locking mechanism from a movable section of a front side of the goods holder so as to release said movable section.

* * * * *